Nov. 15, 1938.  H. A. SMITH  2,136,764
MULTIHEAT ELECTRIC APPLIANCE
Filed May 24, 1937
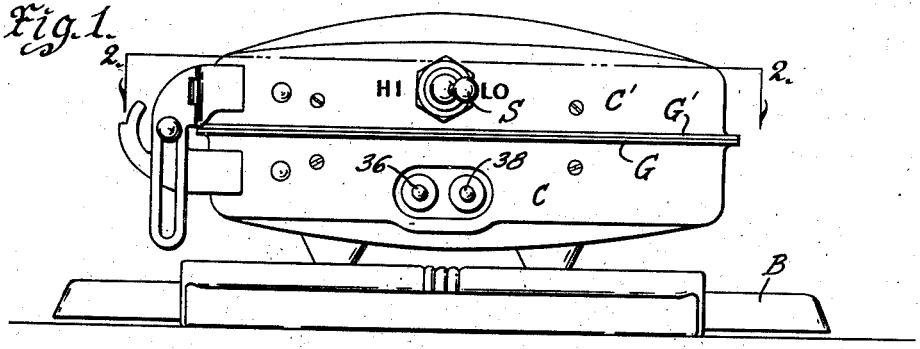
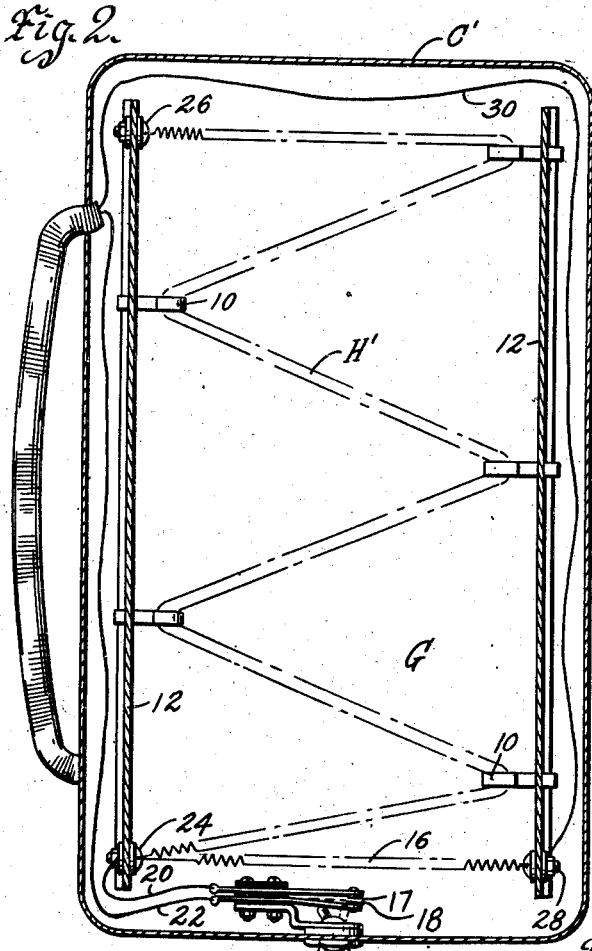
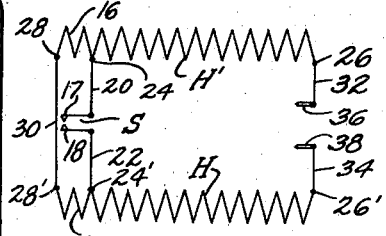
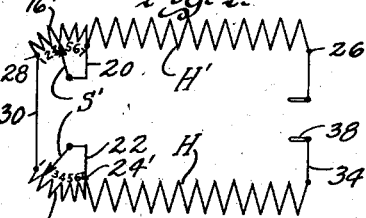
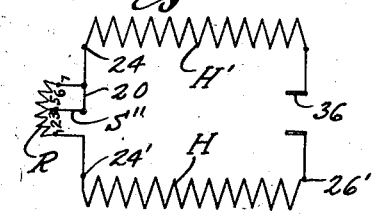
Inventor
Howard A. Smith
by Bair & Freeman
Attorneys Patented Nov. 15, 1938

2,136,764

UNITED STATES PATENT OFFICE 2,136,764

MULTIHEAT ELECTRIC APPLIANCE

Howard A. Smith, St. Louis, Mo., assignor to Knapp-Monarch Company, St. Louis, Mo., a corporation of Missouri Application May 24, 1937, Serial No. 144,420

2 Claims. (Cl. 219—19)

An object of my invention is to provide an electric appliance, having a heating element with a simple means to secure different degrees of heat.

A further object is to provide a switch so connected with the heating element of an electric appliance as to be operable to increase the wattage consumed thereby, and to thereby secure when the switch is open, a relative low heat and when it is closed a relative high heat, thus providing a two heat element for sandwich toasters, waffle irons, bread toasters and the like.

A further object is to provide a modified construction in which a potentiometer is used in the heating element circuit instead of a switch, whereby various degrees of heat between low and high can be selected and secured, individual potentiometers being provided for different heating elements in a multipart appliance if desired, whereby the relative heats of the different parts can be regulated.

With these and other objects in view, my invention consists in the construction, arrangement and combination of the various parts of my multi-heat electric appliance, whereby the objects contemplated are attained, as hereinafter more fully set forth, pointed out in my claims, and illustrated in the accompanying drawing, in which:

Figure 1 is an end elevation of an electric appliance, such as a toaster, showing a switch applied thereto to secure either high or low heat selectively.

Figure 2 is a sectional view on the line 2—2 of Figure 1, showing the switch connected with one of the heating elements of the appliance.

Figure 3 is a diagrammatic view showing the heating element, its terminals and the control switch connected in circuit therewith.

Figure 4 is a similar view showing a potentiometer control for each of the heating elements of the appliance, whereby the heating elements can be individually controlled.

Figure 5 is a similar, diagrammatic view showing how a single potentiometer can be used for controlling both heating elements.

On the accompanying drawing, I have used the reference character B to indicate generally a base and C and C', casings of a sandwich toaster.

As shown in Figure 2, a heating element H' is provided within the casing C' and a similar heating element H (shown diagrammatically in Figure 3) is provided within the casing C.

The casings C and C' have their top and bottom respectively closed by grids G and G'.

The heating elements H and H' are supported by insulators 10, which in turn are supported by sheet metal flanges 12 secured to the grids G and G'.

Each of the heating elements H and H' has a portion indicated at 14 and 16 respectively, which are provided for the purpose of being in the circuit of the heating elements during low temperature operation and to be removed therefrom during high temperature operation.

The control to secure either high or low temperature comprises a switch S, having contacts 17 and 18. These contacts normally remain separated and may be closed by swinging the switch S (which is illustrated as being a toggle lever) from the full line position of Figure 2 to the dotted line position.

The contacts 17 and 18 are connected in the circuit by wires 20 and 22. The wire 20 extends to a terminal bolt 24 to which one end of the heating element H' and one end of the portion 16 thereof are connected. The other end of the heating element H' is connected to a terminal 26 while the other end of the portion 16 thereof is connected to a terminal 28.

Likewise for the casing C and heating element H and its portion 14, terminal bolts 24', 26' and 28' are provided. (See Figure 3.)

The terminals 28 and 28' are connected together by a wire 30, while the terminals 26 and 26' are connected by wires 32 and 34 to terminals 36 and 38. The terminals 36 and 38 are adapted for connection with a supply plug in the usual manner.

In the operation of the form of invention thus far described, when the switch S is in open position, the entire heating element system, comprising the elements H and H', together with their portions 14 and 16 are in the circuit.

Whenever the switch S is closed, the portions 14 and 16 are shunted out of the circuit, thus reducing the resistance, and thereby increasing the wattage consumed.

This, of course, results in an increase in the temperature of the heating elements H and H' and likewise heats the grids G and G' to a higher temperature.

As shown in Figure 4, the heating elements H and H' may have portions 14' and 16', which together with a variable switch lever S' provide a potentiometer control for the wattage consumed by the heating elements.

The numbers "1, 2, 3, 4, 5, 6 and 7" indicate different degrees of heat and by moving the switch arms S' as desired, various heats may be secured for the heating elements H and H' due to eliminating more or less of either the heating element portions 14' or 16'. Thus selection is possible for each of the heating elements in both the lower part of the appliance casing and the upper part thereof. This is desirable in connection with an appliance of the type for toasting sandwiches or for making waffles, because if the sandwich or waffle is browner on one side than the other, the switches S' can be individually adjusted as desired to correct the unevenness in baking or toasting.

As shown in Figure 5, instead of the heating elements H and H' having portions 14 and 16, a separate resistance R can be provided and a switch S" adjustable relative thereto to secure a single potentiometer control for both the upper and lower grids of the appliance.

The resistance R may be so located that the heat from it does not materially affect the grid, but the resistance depending upon how much of it is in circuit is effective to change the wattage consumed by the heating elements H and H'.

Variations of the character described and others as well may be made without departing from the real spirit and purpose of my invention, and it is my intention to cover by my claims, any modified forms of structure or use of mechanical equivalents, which may be reasonably included within their scope.

I claim as my invention:

1. In a multi-heat electric appliance, a pair of appliance casings, a pair of heating elements, one in each of said casings, terminals for one end of each of said heating elements, the other ends of said heating elements being connected together, and a single switch operable when closed to establish a path for current flow between said heating elements which shunts a part of each of them out of the circuit.

2. In a multi-heat electric appliance, a pair of appliance casings, a pair of heating elements, one in each of said casings, terminals for one end of each of said heating elements, the other ends of said heating elements being connected together, and a switch connected at a point on one of said heating elements between its terminal and the connection of said heating elements together, and with a corresponding point on the other of said heating elements between its terminal and the connection of said heating elements together.

HOWARD A. SMITH.